United States Patent Office 2,833,768
Patented May 6, 1958

2,833,768

COMPOUNDS WITH VITAMIN B₁-LIKE ACTIVITY AND THE PREPARATION THEREOF

Motonori Fujiwara and Hiroshi Watanabe, Kyoto, Taizo Matsukawa, Osaka, Syojiro Yurugi, Kyoto, and Takeo Iwatsu and Hajime Kawasaki, Osaka, Japan, assignors to Takeda Pharmaceutical Industries, Ltd., Osaka, Japan, a Japanese firm No Drawing. Application March 30, 1956
Serial No. 574,976

Claims priority, application Japan January 22, 1952

12 Claims. (Cl. 260—256.5)

The present invention relates to compounds having vitamin $B_1$-like activity and to the preparation thereof.

A primary object of the present invention is the embodiment of compounds which are endowed with the advantages of vitamin $B_1$ but which are free of the disadvantages thereof. A further object is the development of a simple and efficient method for the preparation of the said compounds.

The first of these objects is realized according to the present invention by the class of compounds which correspond to the formula

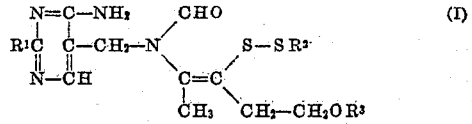     (I)

wherein $R^1$ is $CH_3$ or $C_2H_5$, $R^2$ is an alkyl, aralkyl or aryl group, and $R^3$ is a hydrogen atom or an acetyl or benzoyl group.

The compounds of the aforesaid class, corresponding to the foregoing formula, have the following properties in common:

(1) They give negative thiochrome and negative diazo reactions.

(2) They react with cysteine, reductive glutathion, slices of the liver, etc. to give vitamin $B_1$ and become positive to thiochrome and diazo reactions.

(3) They are not decomposed by thiaminase.

(4) They are not decomposed by the vitamin $B_1$ decomposition factors in the plant.

(5) They are soluble in organic solvents such as alcohol, ether, ethyl acetate, etc.

Some of the physico-chemical properties of the compounds are as follows:

| $R^1$ | $R^2$ | $R^3$ | M. P. (decomp.) °C. | Solvent for recrystallization | Crystal form |
|---|---|---|---|---|---|
| $CH_3$ | $CH_3$ | H | 135–136 | Ethyl acetate | Colorless prisms. |
| $CH_3$ | $CH_3$ | H | 150 | Water | Do. |
| $CH_3$ | $C_2H_5$ | H | 126–127 | Benzene | Do. |
| $CH_3$ | $C_2H_5$ | H | 167 | Water | Do. |
| $CH_3$ | n-$C_3H_7$ | H | 127–128 | Benzene | Do. |
| $CH_3$ | n-$C_3H_7$ | H | 145 | Water | Do. |
| $CH_3$ | i-$C_3H_7$ | H | 163–164 | Benzene | Do. |
| $CH_3$ | n-$C_4H_9$ | H | 136–137 | do | Do. |
| $CH_3$ | n-$C_4H_9$ | H | 150 | Water | Do. |
| $CH_3$ | i-$C_4H_9$ | H | 154 | Ethyl acetate | Do. |
| $CH_3$ | i-$C_4H_9$ | H | 174 | Water | Do. |
| $CH_3$ | i-$C_5H_{11}$ | H | 135 | Benzene | Do. |
| $CH_3$ | i-$C_5H_{11}$ | H | 154 | Water | Do. |
| $CH_3$ | $C_8H_{17}$ | H | 132–133 | Diluted alcohol | Do. |
| $CH_3$ | $C_{12}H_{25}$ | H | 133–134 | do | Do. |
| $CH_3$ | $C_6H_5$—$CH_2$ | H | 154 | Benzene | Do. |
| $CH_3$ | $CH_2$=$CH$—$CH_2$ | H | 132–133 | do | Do. |
| $CH_3$ | $CH_2$=$CH$—$CH_2$ | H | 141 | Water | Do. |
| $CH_3$ | $C_2H_5$ | $C_6H_5CO$— | 77–78 | do | Do. |
| $CH_3$ | $C_4H_9$ | $C_6H_5CO$— | 60–61 | do | Do. |
| $CH_3$ | i-$C_4H_9$ | $C_6H_5CO$— | 88–89 | do | Do. |
| $CH_3$ | i-$C_5H_{11}$ | $C_6H_5CO$— | 91–92 | A mixture of benzene and benzine. | Do. |
| $CH_3$ | $CH_2$=$CH$—$CH_2$ | $C_6H_5CO$— | 114–115 | do | Do. |
| $CH_3$ | n-$C_3H_7$ | $C_6H_5CO$— | 89–90 | do | Do. |
| $CH_3$ | $CH_3$— | $C_6H_5CO$— | 78–80 | do | Do. |
| $C_2H_5$ | $CH_3$ | H | 122–123 | Benzene | Do. |
| $C_2H_5$ | $C_2H_5$ | H | 123–133 | do | Do. |
| $C_2H_5$ | $C_3H_7$ | H | 130–131 | do | Do. |
| $C_2H_5$ | $C_4H_9$ | H | 119–120 | do | Do. |
| $CH_3$ | $CH_2$—$CH_2$—OH | H | 148–149 | A mixture of alcohol, benzene and ethyl acetate. | Do. |

Due to their constitution, the new vitamin $B_1$ derivatives of the present invention are all basic in character and form a large variety of acid salts. That is, when a new vitamin $B_1$ derivative reacts with an acid, the corresponding acid salt of the formula

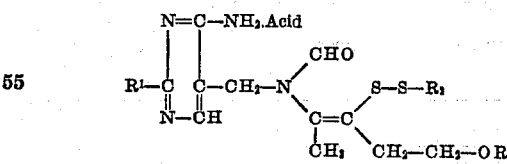

is readily produced. The following tabular summary sets forth representative salts of this charcter and their properties.

| $R^1$ | $R^2$ | $R^3$ | Acid | M. P. (decomp.), °C. | Solvent for recrystallization | Crystal form |
|---|---|---|---|---|---|---|
| $CH_3$ | $CH_3$ | H | HCl | 171-172 | Alcohol-ether | Colorless needles. |
| $CH_3$ | $C_2H_5$ | H | HCl | 174-175 | ___do___ | Do. |
| $CH_3$ | $C_3H_7$ | H | HCl | 160-161 | ___do___ | Do. |
| $CH_3$ | $C_3H_7$ | H | $HNO_3$ | 108-110 | ___do___ | Do. |
| $CH_3$ | $C_3H_7$ | H | HBr | 142-143 | ___do___ | Colorless prisms. |
| $CH_3$ | $C_3H_7$ | H | $HClO_4$ | 153-155 | ___do___ | Colorless needles. |
| $CH_3$ | $C_3H_7$ | H | $(COOH)_2$ | 128-129 | ___do___ | Do. |
| $CH_3$ | $C_3H_7$ | H | $C_6H_5SO_3H$ | 161 | Alcohol-benzine | Colorless grains. |
| $CH_3$ | $C_4H_9$ | H | HCl | 159-160 | Alcohol-ether | Colorless needles. |
| $CH_3$ | $i-C_4H_9$ | H | HCl | 160-161 | ___do___ | Do. |
| $CH_3$ | $i-C_5H_{11}$ | H | HCl | 159-160 | ___do___ | Do. |
| $CH_3$ | $CH_2=CHCH_2-$ | H | HCl | 151-152 | ___do___ | Do. |
| $CH_3$ | $C_6H_5CH_2-$ | H | $HNO_3$ | 163-164 | Alcohol (99%) | Colorless prisms. |
| $CH_3$ | $C_6H_5CH_2-$ | H | HBr | 186-187 | Alcohol-ether | Do. |
| $CH_3$ | $C_6H_5CH_2-$ | H | $HClO_4$ | 153-155 | ___do___ | Do. |
| $CH_3$ | $C_6H_5CH_2-$ | H | $(COOH)_2$ | 155-156 | ___do___ | Do. |
| $CH_3$ | $C_6H_5CH_2-$ | H | HI | 165-166 | | Do. |
| $CH_3$ | $C_6H_5CH_2-$ | H | $H_2SO_4/2$ | 160-161 | Alcohol-ether | Colorless needles. |
| $CH_3$ | $CH_3$ | $C_6H_5CO-$ | HCl | 182-183 | ___do___ | Do. |
| $CH_3$ | $C_2H_5$ | $C_6H_5CO-$ | HCl | 154-155 | ___do___ | Do. |
| $CH_3$ | $C_3H_7$ | $C_6H_5CO-$ | HCl | 155-156 | ___do___ | Do. |
| $CH_3$ | $C_4H_9$ | $C_6H_5CO-$ | HCl | 155 | ___do___ | Do. |
| $CH_3$ | $i-C_4H_9$ | $C_6H_5CO-$ | HCl | 170 | ___do___ | Do. |
| $CH_3$ | $i-C_5H_{11}$ | $C_6H_5CO-$ | HCl | 144-145 | ___do___ | Do. |
| $CH_3$ | $CH_2=CHCH_2-$ | $C_6H_5CO-$ | HCl | 162-163 | ___do___ | Do. |

As in the case of vitamin $B_1$, these acid salts show an activity similar to that of their free bases in the living body. The characteristic solubility of the said acid salts in water or other appropriate solvent makes it possible to administer them by injection; they are also useful as fortifying agents for foods etc.

The compounds of the invention, like vitamin $B_1$, increase the body weights of rats, when used in the "growth test of rats," thus evidencing almost the same physiological activities as vitamin $B_1$.

For example, when $10\gamma$ each of the compound ($R^1=CH_3$, $R^2=CH_2CH=CH_2$, $R^3=H$) is given per os to rats which have lost weight and are affected with irregular pulse and convulsions owing to the lack of vitamin $B_1$, the effects of the compound appear rapidly as shown in Table I:

TABLE I

| | Pulse | Irregular pulse | Convulsion |
|---|---|---|---|
| Before Administration | 120 | + | + |
| After Administration: | | | |
| 15 min | 225 | − | − |
| 30 min | 260 | − | − |
| 45 min | 230 | − | − |
| 60 min | 240 | − | − |
| 120 min | 340 | − | − |

When this compound is administered per os to the human body, it increases remarkably the vitamin $B_1$ concentration in the blood (Table III) and is excreted in the urine more rapidly and in larger quantity than vitamin $B_1$ (Table II).

TABLE II

The amount of vitamin $B_1$ excreted in urine

| Specimen Time after administration | Present compound (10 mg.) | Vitamin $B_1$ (10 mg.) |
|---|---|---|
| 1 hour | $410\gamma$ | $60\gamma$ |
| 1-2 hours | $440\gamma$ | $140\gamma$ |
| 2-3 hours | $320\gamma$ | $90\gamma$ |
| 3-24 hours | $1,110\gamma$ | $450\gamma$ |
| Total | $2,280\gamma$ | $740\gamma$ |

TABLE III

Vitamin $B_1$ concentration in blood

| | Present compound (10 mg.), percent | Vitamin $B_1$ (10 mg.), percent |
|---|---|---|
| Before administration | 6.3 | 6.3 |
| 1 hour after administration | 11.2 | 6.3 |

From the above facts it is evident that the compound is absorbed from the intestines very effectively.

In brief, the compounds of the present invention, when given per os, show evident and rapid vitamin $B_1$-like effects, and in addition, not being decomposed by thiaminase they give beneficial effect to people who do not realize the effect of vitamin $B_1$ given by the mouth.

Variation of groups in $R^1$, $R^2$ and $R^3$ has almost no effect on the activity of the compounds. The data of the animal test of the compounds are shown as follows:

ANIMAL TEST (The terms, T. A. D., T. M. D., T. E. D., T. P. D and T. B. D. in the following imply the compounds corresponding to the general formula in which $R^1$ is methyl, $R^3$ is H and $R^2$ is allyl, methyl, ethyl, propyl and butyl, respectively.)

(1) *Survival test of rice birds.*—$5\gamma$ each of vitamin $B_1$, T. A. D., T. M. D., T. E. D., T. P. D. and T. B. D. were administered to rice birds separately, and the activities of the compounds were adjudged by measuring life-span of the birds. As a result it was found that the new vitamins were as active as vitamin $B_1$ (Table 1).

TABLE 1

Life-span (days)

| | |
|---|---|
| Birds administered with $B_1$ | >20 |
| Birds administered with new vitamins | >20 |
| Birds administered with $B_1$-deficient diet | 8< |

(2) *Test for healing $B_1$ avitaminosis of pigeons.*—(i) $10\gamma$ each of T. A. D. and T. P. D. were administered per os to the pigeons which had been fed on polished rice and which were affected with convulsions owing to $B_1$ avitaminosis, and the time was observed when they had completely recovered from the convulsions and could walk. As a result it was found that the effects of the new vitamins appeared within several hours. (Table 2).

TABLE 2

|  | Dose (γ) | Time required for cure of convulsions | Time required to become able to walk |
|---|---|---|---|
| T. A. D. | 10 | 4 h., 30 min. | 5 h., 0 min. |
|  | 50 | 2 h., 30 min. | 3 h., 30 min. |
| T. P. D. | 10 | 3 h., 0 min. | 4 h., 30 min. |
|  | 50 | 2 h., 30 min. | 3 h., 0 min. |

(ii) When administered by subcutaneous injection they exhibit effects within 1–2 hours as vitamin $B_1$.

(3) *Growth test of rats.*—(i) 40γ each of T. A. D. and T. P. D. were administered separately per os to rats, and their effects on the growth of the rats were observed for 60 days. As a result it was found that increase in the body weight of the rats administered with the new vitamins was larger than that of the rats administered with vitamin $B_1$ (Table 3).

TABLE 3
Increase in body weight [1]

|  | Before test | After test, 2 days | After test, 12 days | After test, 22 days | After test, 32 days | After test, 42 days | After test, 52 days |
|---|---|---|---|---|---|---|---|
| T. P. D. | 47 | 51 | 72 | 102 | 132 | 154 | 169 |
| T. A. D. | 48 | 52 | 76 | 100 | 127 | 141 | 160 |
| $B_1$ | 49 | 54 | 74 | 88 | 117 | 138 | 157 |

[1] Each datum is the average value of 8 rats.

In this case $B_1$ content in the entrails of the rats administered with the new vitamins was larger than that of the rats administered with $B_1$ (Table 4).

TABLE 4
$B_1$ content in entrails (γ, percent)

|  | Rats administered with T. P. D. | Rats administered with T. A. D. | Rats administered with $B^1$ |
|---|---|---|---|
| Liver | 823 | 673 | 415 |
| Kidney | 445 | 517 | 276 |
| Brain | 246 | 280 | 248 |

(ii) T. M. D. was administered per os or by subcutaneous injection and T. E. D. per os to rats separately, and their effects on the growth of the rats were observed. As a result it was found that T. M. D. and T. E. D. had the same beneficial effect as T. A. D. and T. P. D.

(4) *Test for healing $B_1$ avitaminosis of rats.*—T. A. D. and T. P. D. were administered to rats which had been fed on $B_1$-deficient diet and which had slow pulsation owing to $B_1$ avitaminosis. As a result it was found that they increased the pulsation as good as vitamin $B_1$.

(5) *Conversion of the new vitamins into $B_1$-bound form in animal body.*—T. A. D. and vitamin $B_1$ were administered separately and in the same manner to animals, and their phosphoration was observed by the quantitative determination of $B_1$ in the liver. As a result it was found that the new vitamin was phosphorized more strongly than vitamin $B_1$ (Table 5).

TABLE 5

| Administration conditions | T. A. D., Free $B_1$/total $B_1$ | $B_1$, Free $B_1$/total $B_1$ |
|---|---|---|
| 40γ per os | 4.9 | 7.4 |
| 120γ per os | 2.6 | 3.6 |
| 240γ subcutaneous injection | 13.6 | 24.0 |
| Do | 9.4 | 18.2 |
| Do | 10.5 | 17.6 |

(6) *Lethal dose.*—T. A. D. and T. M. D. were administered per os or by intravenous injection to mice, and their L. D. 50 per 10 g. body weight was observed. As a result it was found that the lethal doses of T. A. D. and T. M. D. were two times as large as that of vitamin $B_1$ (Table 6).

TABLE 6

| Administration conditions | T. A. D., mg. | T. M. D., mg. | $B_1$, mg. |
|---|---|---|---|
| Per os | 5.4 | 12.5 | >15 |
| Intravenous injections | 2.5 | 2.0 | 0.9 |

TESTS ON HUMAN BODY (1) *Excretion amount in urine of T. A. D. and T. P. D. in the case of per os administration.*—In order to observe the excretion amount in urine of T. A. D. and T. P. D. 5, 10, 20 and 40 mg. of them were administered per os, and their excretion amount in urine was determined at 1, 2, 3 and 24 hours after administration. Results are as follows:

(i) It was found that the new vitamins were all excreted in urine as free vitamin $B_1$.

(ii) The new vitamins were excreted faster and in larger quantity than vitamin $B_1$ and the excretion amount increased with the dose as is seen from Tables 7 and 8.

TABLE 7

| Dose | T. P. D., 20 mg., γ | T. A. D., 20 mg., γ | $B_1$, 20 mg., γ |
|---|---|---|---|
| 0–1 h | 632 | 900 | 120 |
| 1–2 h | 700 | 466 | 240 |
| 2–3 h | 467 | 566 | 277 |
| 3–24 h | 1,560 | 1,682 | 960 |
| Total | 3,359 | 3,614 | 1,597 |

TABLE 8

| Dose | T. A. D., Excretion amount in a day (γ) | $B_1$ Excretion amount in a day (γ) |
|---|---|---|
| 5 mg | 1,668 | 1,028 |
| 10 mg | 2,834 | 1,113 |
| 20 mg | 3,614 | 1,597 |
| 40 mg | 7,384 | 1,890 |

From the above results it is evident that the new vitamins are more easily absorbed by intestines than $B_1$.

(2) *Increase of $B_1$ content in blood in the case of per os administration.*—10 mg. of T. A. D. was administered per os, and $B_1$ content at 1 and 2 hours after administration was measured. As a result it was found that $B_1$ content was larger than in the case of $B_1$ (Table 9).

TABLE 9

|  |  | T. A. D. (γ percent) | $B_1$ (γ percent) |
|---|---|---|---|
| No. 1 | Before administration | 7.3 | 7.3 |
|  | 1 hour after administration | 9.5 | 7.3 |
|  | 2 hours after administration | 16.3 | 11.0 |
| No. 2 | Before administration | 6.1 | 7.0 |
|  | 1 hour after administration | 9.0 | 7.4 |
|  | 2 hours after administration | 10.6 | 8.2 |
| No. 3 | Before administration | 7.2 | 6.6 |
|  | 1 hour after administration | 11.2 | 8.0 |
|  | 2 hours after administration | 12.2 | 7.8 |

(3) *Excretion amount in urine of T. A. D. and T. P. D. in the case of administration of subcutaneous or intravenous injection.*—5 mg. each of T. A. D. and T. P. D. was administered by subcutaneous or intravenous injection, and their excretion amount in urine was measured. As a result it was found that the new vitamins were excreted more slowly than vitamin $B_1$ (Table 10).

TABLE 10

|  | T. A. D. (γ) | T. P. D. (γ) | $B_1$ (γ) |
| --- | --- | --- | --- |
| Subcutaneous injection: |  |  |  |
| 3 h | 864 | 720 | 1,836 |
| 24 h | 703 | 648 | 966 |
| Total | 1,567 | 1,368 | 2,802 |
| Intravenous injection: |  |  |  |
| 3 h | 871 | 1,095 | 2,091 |
| 24 h | 900 | 875 | 440 |
| Total | 1,771 | 1,970 | 2,531 |

(4) *Variation of $B_1$ content in blood in the case of administration by subcutaneous injection.*—T. A. D. and T. P. D. were administered by subcutaneous injection, and $B_1$ content in blood was measured at 30 and 60 minutes after administration. As a result it was found that the new vitamins increased $B_1$ content in blood more than $B_1$ (Table 11).

TABLE 11

|  |  | T. A. D. (γ percent) | T. P. D. (γ percent) | $B_1$ (γ percent) |
| --- | --- | --- | --- | --- |
| No. 1 | Before administration | 5.1 | 5.6 | 4.2 |
|  | 30 min. after administration | 28.8 | 24.5 | 7.3 |
|  | 60 min. after administration | 25.6 | 22.4 | 5.9 |
| No. 2 | Before administration | 6.7 | 4.9 | 7.7 |
|  | 30 min. after administration | 26.6 | 20.3 | 11.9 |
|  | 60 min. after administration | 23.8 | 19.5 | 9.1 |

(5) *Test for healing beriberi.*—10 mg. of T. A. D. or T. P. D. was administered per os, for 1-2 weeks to 5 beriberi patients who had been treated with 10 mg. of vitamin $B_1$ for a month but could not recover. As a result the symptom was remarkably improved and $B_1$ content in blood of the patients was increased.

The second of the initially-recited objects is realized according to the invention, briefly stated, as follows:

Vitamin $B_1$, its related compounds or their acyl derivatives are reacted with an active compound which serves to convert the —SH group into the —S—S—$R^2$ group. For example, vitamin $B_1$, the compound which has the same structure as vitamin $B_1$ except that the methyl group in the pyrimidine nucleus is replaced with an ethyl group, or their acyl derivatives are reacted with a compound corresponding to one of the formulae
H—S—$R^2$,

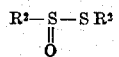

$R^2$—S—S—CN or $R^2$—S—$SO_3M$, wherein $R^2$ is an alkyl, aralkyl or aryl group, and M is one of the metals potassium and sodium. Examples of such compounds are the alkyl mercaptans, aryl mercaptans, aralkyl mercaptans, as allyl mercaptan, aryl mercaptans, aralkyl mercaptans, aralkyl aralkylthiosulfinates, alkyl alkylthiosulfinates, unsaturated-alkyl unsaturated-alkylthiosulfinates such as allyl allylthiosulfinate, aryl arylthiosulfinates, alkyl (or aryl or aralkyl or unsaturated alkyl, such as allyl) thiothiocyanates, salts of alkyl (or aryl or aralkyl or unsaturated alkyl, such as allyl) thiosulfonic acids, etc. The above mentioned saturated or unsaturated alkyl or aralkyl can be substituted.

Without intending thereby to restrict the scope of the invention, it is generally believed that the vitamin $B_1$ and its acyl derivatives are in the state of equilibrium between the ammonium-type and the thiol-type:

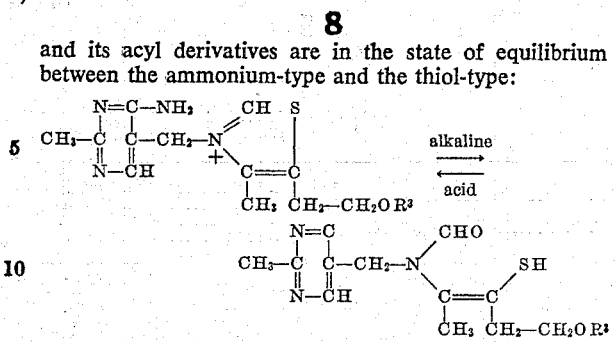

and that the equilibrium shifts to the right under alkaline conditions and to the left under acidic conditions. From the structures of the products of the present invention, the vitamin $B_1$ and its derivatives appear to take part in the reactions in their thiol-type. In fact, the reaction proceeds most smoothly at over pH 7, but too strong alkalinity not only decomposes vitamin $B_1$ itself but also brings about rupture at the —S—S group of the products, and therefore cuts down the yield of the products. Consequently, pH 7-9 is the most suitable for industrial purposes.

The reactions, which are thus preferably carried out at a pH of 7-9, are carried out most satisfactorily in a medium such as water, alcohol, acetone, methanol, propyl alcohol, ethyl acetate or their mixtures, but other solvents which are indifferent to the reactions can be also employed.

When the acyl derivatives are used, the acyl groups can be removed from the products; conversely, acyl groups can be introduced into the products. Alkyl (or aralkyl or aryl) mercaptans are generally used with an oxidizing agent which works in neutral or alkaline medium, for example, bromine, hydrogen peroxide, potassium permanganate, alkali bichromate, etc. Electrolytic oxidation also can be used for the same purpose.

The yields in the reactions of the present invention are generally very excellent.

The following examples set forth, by way of illustration, presently-preferred embodiments of the invention. In these examples, the parts and percentages are by weight.

EXAMPLE 1

0.5 part of allyl allylthiosulfinate and 1 part of vitamin $B_1$ hydrochloride are dissolved in 50 parts of 50% ethanol and the solution is adjusted to pH 8 with 10% sodium hydroxide solution and heated at 60° C. for 30 minutes. During the reaction, pH is regulated at 8. The reaction mixture is concentrated under reduced pressure to remove the alcohol and the residue is extracted several times with ether. After drying, the ethereal extract is evaporated to dryness, when crystals remain, which are recrystallized from benzene into colorless prisms, M. P. 132-133° C. (decomp.). Hydrochloride, M. P. 151-152° C. (decomp.).

This compound has the structure corresponding to the general Formula I in which $R^1$ is methyl, $R^2$ is allyl, and $R^3$ is H.

EXAMPLE 2

5 parts of vitamin $B_1$ hydrochloride are dissolved in 250 parts of water and then 1.5 parts of methyl methylthiosulfinate are added. The mixture is adjusted to pH 8 with 10% sodium hydroxide solution and heated at 50-60° C. until the reaction mixture has become negative to the thiochrome reaction. During the reaction, pH is regulated at 8. The reaction mixture is concentrated to half its volume under reduced pressure and then extracted with ethly acetate. After drying, the extract is evaporated to dryness under reduced pressure, when the product remains in crystalline form, which is recrystallized from ethyl acetate into colorless prisms, M. P. 134-135° C. (decomp.), from water into crystals of the same form.

M. P. 150° C. (decomp.). Hydrochloride, M. P. 171–172° C. (decomp.). Yield, 4 parts. This compound has the structure corresponding to the general Formula I in which $R^1$ and $R^2$ are methyl and $R^3$ is H.

EXAMPLE 3

1.7 parts of vitamin $B_1$ hydrochloride are dissolved in 50 parts of water and then 0.7 part of ethyl ethylthiosulfinate is added. The mixture is adjusted to pH 8 with 10° sodium hydroxide solution and treated as in Example 2.

The product crystallizes from benzene into colorless prisms, M. P. 126–127° C. (decomp.), from water into crystals of the same form, M. P. 167° C. (decomp). Yield, 1.3 parts. Hydrochloride, 174–175° C. (decomp.). This compound has the structure corresponding to the general Formula I in which $R^1$ is methyl, $R^2$ is ethyl and $R^3$ is H.

EXAMPLE 4

1.7 parts of vitamin $B_1$ hydrochloride are dissolved in 100 parts of 50% ethanol and 0.75 part of propyl propylthiosulfinate is added and the mixture is treated the same as in Example 2. The product crystallizes from benzene into colorless prisms, M. P. 128–129° C. (decomp.), from water into crystals of the same form, M. P. 145° C. (decomp.). Yield, 1.5 parts. Hydrochloride, M. P. 160–161 C. (decomp.).

This compound has the structure corresponding to the general Formula I in which $R^1$ is methyl, $R^2$ is propyl and $R^3$ is H.

EXAMPLE 5

1.7 parts of vitamin $B_1$ hydrochloride are dissolved in 100 parts of 50% ethanol and 0.75 part of isopropyl isopropylthiosulfinate is added and the mixture is treated the same is in Example 2. The product crystallizes from benzene into colorless prisms, M. P. 163–164° C. (decomp.). Yield, 1.5 parts. This compound has the structure corresponding to the general Formula I in which $R^1$ is methyl, $R^2$ is isopropyl, and $R^3$ is H.

EXAMPLE 6

1.7 parts of vitamin $B_1$ hydrochloride are dissolved in 130 parts of 50% ethanol and 0.9 part of butyl butylthiosulfinate is added and the mixture is treated the same as in Example 2.

The product crystallizes from benzene into colorless prisms, M. P. 136–137° C. (decomp.), from water into crystals of the same form, M. P. 150° C. (decomp.). Yield, 1.7 parts. Hydrochloride, M. P. 159–160° C. (decomp.). This compound has the structure corresponding to the general Formula I in which $R^1$ is methyl, $R^2$ is butyl and $R^3$ is H.

EXAMPLE 7

Vitamin $B_1$ hydrochloride is reacted with isobutyl isobutylthiosulfinate quite the same as in Example 6.

The product crystallizes from ethyl acetate into colorless prisms, M. P. 154° C. (decomp.), from water into crystals of the same form, M. P. 174° C. (decomp.). Yield, 1.7 parts. Hydrochloride, M. P. 160–161° C. This compound has the structure corresponding to the general Formula I in which $R^1$ is methyl, $R^2$ is isobutyl and $R^3$ is H.

EXAMPLE 8

1.7 parts of vitamin $B_1$ hydrochloride are dissolved in 150 parts of 50% ethanol and 1 part of isoamyl isoamylthiosulfinate is added, and the mixture is treated the same as in Example 2.

The product crystallizes from benzene into colorless prisms, M. P. 135° C. (decomp.), from water into crystals of the same form, M. P. 154° C. (decomp.). Yield, 1.8 parts. Hydrochloride, M. P. 159–160° C. (decomp.). This compound has the structure corresponding to the general Formula I in which $R^1$ is methyl, $R^2$ is isoamyl and $R^3$ is H.

EXAMPLE 9

5 parts of N-(2-ethyl-4'-amino-pyrimidyl (5))-methyl-4-methyl-5-$\beta$-hydroxy-ethyl-thiazolium chloride hydrochloride (referred to as homovitamin $B_1$ hydrochloride hereafter) are dissolved in 250 parts of 50% ethanol and 1.5 parts of methyl methylthiosulfinate are added. The mixture is adjusted to pH 8 with 10% sodium hydroxide solution, heated at 40–50° C. and treated as in Example 2.

The product crystallizes from benzene into colorless prisms, M. P. 122–123° C. (decomp.). Yield, 4 parts. This compound has the structure corresponding to the general Formula I in which $R^1$ is ethyl, $R^2$ is methyl and $R^3$ is H.

EXAMPLE 10

1.7 parts of homovitamin $B_1$ hydrochloride are reacted with 0.8 part of ethyl ethylthiosulfinate at 50–60° C. as in Example 2.

The product crystallizes from benzene into colorless prisms, M. P. 132–133° C. (decomp.). Yield, 1.3 parts. This compound has the structure corresponding to the general Formula I in which $R^1$ and $R^2$ are ethyl and $R^3$ is H.

EXAMPLE 11

1.7 parts of homovitamin $B_1$ hydrochloride are reacted with 0.75 part of propyl propylthiosulfinate in 100 parts of 50% ethanol as in Example 2.

The product crystallizes from benzene into colorless prisms, M. P. 130–131° C. (decomp.). Yield, 1.5 parts. This compound has the structure corresponding to the general Formula I in which $R^1$ is ethyl, $R^2$ is propyl and $R^3$ is H.

EXAMPLE 12

1.7 parts of homovitamin $B_1$ hydrochloride are reacted with 0.9 part of butyl butylthiosulfinate in 120 parts of 50% ethanol in Example 2.

The product crystallizes from benzene into colorless prisms, M. P. 119–120° C. (decomp.). Yield 1.7 parts. This compound has the structure corresponding to the general formula in which $R^1$ is ethyl, $R^2$ is butyl and $R^3$ is H.

EXAMPLE 13

1.3 parts of benzoylvitamin $B_1$ hydrobromide are dissolved in 10 parts of water and 0.25 part of methyl methylthiosulfinate is added. The mixture is adjusted to pH 8 with 10% sodium hydroxide solution and heated at 50–60° C. until the reaction mixture has become negative to the thiochrome reaction. On concentrating the reaction mixture, an oily substance separates out, which crystallizes immediately. The product is dissolved in diluted hydrochloric acid and the solution, after decolorizing, is neutralized with sodium bicarbonate, when colorless prisms, M. P. 78–80° C., separate out. Yield, 1 part. Hydrochloride, M. P. 182–183° C. (decomp.). This compound has the structure corresponding to the general Formula I in which $R^1$ and $R^2$ are methyl and $R^3$ is benzoyl.

EXAMPLE 14

2.5 parts of benzoylvitamin $B_1$ hydrobromide are reacted with 0.75 part of propyl propylthiosulfinate in 100 parts of 50% ethanol as in Example 13. The crude oily product is extracted with ethyl acetate and the extract, after drying, is evaporated under reduced pressure. The oily residue is dissolved in diluted hydrochloric acid and the solution is decolorized and neutralized with sodium bicarbonate, when colorless prisms, M. P. 89–90° C., separate out. Yield, 1.5 parts. Hydrochloride, M. P. 155–156° C. (decomp.). This compound has the structure corresponding to the general Formula I in which $R^1$ is methyl, $R^2$ is propyl and $R^3$ is benzoyl.

EXAMPLE 15

1.3 parts of benzoylvitamin $B_1$ hydrobromide are reacted with 0.37 part of ethyl ethylthiosulfinate in 100 parts of 50% ethanol at 30–40° C. The reaction mixture is concentrated under reduced pressure and the separated oily substance is extracted with ethyl acetate. The extract, after drying, is evaporated under reduced pressure and the oily residue is dissolved in diluted hydrochloric acid. The solution is decolorized and neutralized with sodium bicarbonate, when colorless prisms, M. P. 77–78° C., separate out. Yield, 1 part. Hydrochloride, M. P. 154–155° C. (decomp.). Picrate, M. P. 184–185° C. (decomp.). This compound has the structure corresponding to the general Formula I in which $R^1$ is methyl, $R^2$ is ethyl and $R^3$ is benzoyl.

EXAMPLE 16

1.3 parts of benzoyl vitamin $B_1$ hydrobromide are reacted with 0.45 part of butyl butylthiosulfinate as in Example 15.

The product is colorless prisms, M. P. 60–61° C. Yield, 0.9 part. Hydrochloride, M. P. 155° C. (decomp.). Picrate, M. P. 172° C. (decomp.). This compound has the structure corresponding to the general Formula I in which $R^1$ is methyl, $R^2$ is butyl and $R^3$ is benzoyl.

EXAMPLE 17

1.3 parts of benzoylvitamin $B_1$ hydrobromide are reacted with 0.45 part of isobutyl isobutylthiosulfinate as in Example 15.

The product is colorless prisms, M. P. 88–89° C. Yield, 0.9 part. Hydrochloride, M. P. 170° C. (decomp.). Picrate, M. P. 190–191° C. (decomp.). This compound has the structure corresponding to the general Formula I in which $R^1$ is methyl, $R^2$ is isobutyl and $R^3$ is benzoyl.

EXAMPLE 18

1.3 parts of benzoylvitamin $B_1$ hydrobromide are reacted with 0.5 part of isoamyl isoamylthiosulfinate as in Example 15.

The product is colorless prisms, M. P. 91–92° C. Yield, 0.9 part. Hydrochloride, M. P. 144–145° C. (decomp.). Picrate, M. P. 171–172° C. (decomp.). This compound has the structure corresponding to the general Formula I in which $R^1$ is methyl, $R^2$ is isoamyl and $R^3$ is benzoyl.

EXAMPLE 19

To a solution of 1 part of vitamin $B_1$ hydrochloride in 10 parts of water are added 3.3 parts of 10% sodium hydroxide solution, followed by a solution of 0.7 part of sodium butylthiosulfate in 20 parts of water, when crystals separate out presently.

The product crystallizes from benzene into colorless prisms, M. P. 136–137° C. (decomp.). Yield, 0.8 part.

This compound has the structure corresponding to the general formula I in which $R^1$ is methyl, $R^2$ is butyl and $R^3$ is H.

EXAMPLE 20

1 part of vitamin $B_1$ hydrochloride is reacted with 1 part of sodium benzylthiosulfate as in Example 19.

The product crystallizes from ethyl acetate into colorless prisms, M. P. 154° C. (decomp.). Yield, 1.1 parts.

This compound has the structure corresponding to the general Formula I in which $R^1$ is methyl, $R^2$ is benzoyl and $R^3$ is H.

EXAMPLE 21

A solution of 1 part of vitamin $B_1$ hydrochloride in 10 parts of water is mixed with 3.3 parts of 10% sodium hydroxide solution and the mixture is saturated with sodium chloride and then there is added thereto 1 part of sodium allylthiosulfate, when an oily substance separates out which crystallizes presently. The product crystallizes from benzene into colorless prisms, M. P. 132–133° C. (decomp.). Yield, 1 part. This compound has the structure corresponding to the general Formula I in which $R^1$ is methyl, $R^2$ is allyl and $R^3$ is H.

EXAMPLE 22

1 part of vitamin $B_1$ hydrochloride is dissolved in 3.3 parts of 10% sodium hydroxide solution and the solution is saturated with sodium chloride and then there is added thereto 1 part of sodium methylthiosulfate, when an oily substance separates out which crystallizes presently.

The product crystallizes from ethyl acetate into colorless prisms, M. P. 132° C. (decomp.). Yield, 0.5 part.

This compound has the structure corresponding to the general Formula I in which $R^1$ and $R^2$ are methyl and $R^3$ is H.

EXAMPLE 23

1 part of vitamin $B_1$ hydrochloride is reacted with 1.5 parts of sodium β-oxyethyl thiosulfate as in Example 21.

The product crystallizes from a mixture of alcohol, ethyl acetate and benzene into colorless prisms, M. P. 148–149° C. (decomp.). Yield, 1 part. This compound has the structure corresponding to the general Formula I in which $R^1$ is methyl, $R^2$ is β-oxyethyl and $R^3$ is H.

EXAMPLE 24

1 part of vitamin $B_1$ hydrochloride is reacted with 1 part of sodium propylthiosulfate as in Example 21.

The product crystallizes from benzene into colorless prisms, M. P. 128–129° C. (decomp.). Yield 1 part.

This compound has the structure corresponding to the general Formula I in which $R^1$ is methyl, $R^2$ is propyl and $R^3$ is H.

EXAMPLE 25

3.3 parts of 10% sodium hydroxide solution are added to a solution of 1 part of vitamin $B_1$ hydrochloride in 20 parts of water, and 1 part of sodium octylthiosulfate is dissolved in the solution by warming, when crystals separate out presently.

The product crystallizes from diluted alcohol into colorless needles, M. P. 132–133° C. (decomp.). Yield, 1 part.

This compound has the structure corresponding to the general Formula I in which $R^1$ is methyl, $R^2$ is octyl and $R^3$ is H.

EXAMPLE 26

1 part of vitamin $B_1$ hydrochloride is reacted with 1 part of sodium dodecylthiosulfate as in Example 24.

The product crystallizes from diluted alcohol into colorless needles, M. P. 133–134° C. (decomp.). Yield, 1 part.

This compound has the structure corresponding to the general Formula I in which $R^1$ is methyl, $R^2$ is dodecyl and $R^3$ is H.

EXAMPLE 27

A solution of 1 part of vitamin $B_1$ hydrochloride in 3.3 parts of 10% sodium hydroxide solution is saturated with sodium chloride, and 1 part of sodium ethylthiosulfate is added, when a tribidity forms which crystallizes presently. The product crystallizes from benzene into colorless prisms, M. P. 126–127° C. Yield, 0.8 part.

This compound has the structure corresponding to the general Formula I in which $R^1$ is methyl, $R^2$ is ethyl and $R^3$ is H.

EXAMPLE 28

A solution of 1.5 parts of benzoylvitamin $B_1$ hydrobromide in 15 parts of water has added thereto 3.5 parts of 10% sodium hydroxide solution, followed by a solution of 2 parts of sodium propylthiosulfate in 5 parts of water, when crystals separate out presently.

The product crystallizes from a mixture of benzene and benzine into colorless prisms, M. P. 89–90° C. Yield, 1.1 parts.

Hydrochloride, M. P. 155–156° C. (decomp.).

This compound has the structure corresponding to the general Formula I in which $R^1$ is methyl, $R^2$ is propyl and $R^3$ is benzoyl.

EXAMPLE 29

A solution of 1 part of benzoylvitamin $B_1$ hydrobromide in 10 parts of water has added thereto 3 parts of 10% sodium hydroxide solution, followed by 1 part of sodium allylthiosulfate, when crystals separate out presently. The product crystallizes from a mixture of benzene and benzine into colorless prisms, M. P. 114–115°. Yield, 0.7 part. Hydrochloride, 162–163° C. (decomp.). Picrate, M. P. 191–192° C. (decomp.).

This compound has the structure corresponding to the general Formula I in which $R^1$ is methyl, $R^2$ is allyl and $R^3$ is benzoyl.

EXAMPLE 30

A solution of 1.5 parts of benzoylvitamin $B_1$ hydrobromide in 20 parts of water has added thereto 3.5 parts of 10% sodium hydroxide solution, followed by 1.5 parts of sodium isoamylthiosulfate, when crystals separate out presently. The product crystallizes from a mixture of benzene and benzine into colorless prisms, M. P. 91–92° C. Yield, 1.1 parts.

This compound has the structure corresponding to the general Formula I in which $R^1$ is methyl, $R^2$ is isoamyl and $R^3$ is benzoyl.

EXAMPLE 31

A solution of 0.5 part of homovitamin $B_1$ hydrochloride in 3 parts of water has added thereto 1.7 parts of 10% sodium hydroxide solution, followed by 0.5 part of sodium propylthiosulfate, when crystals separate out presently. The product crystallizes from benzene into colorless prisms, M. P. 130–131° C. (decomp.). Yield, 0.5 part.

This compound has the structure corresponding to the general Formula I in which $R^1$ is ethyl, $R^2$ is propyl and $R^3$ is H.

EXAMPLE 32

A solution of 1 part of homovitamin $B_1$ hydrochloride in 5 parts of water has added thereto 3.4 parts of 10% sodium hydroxide solution, followed by 1 part of sodium butylthiosulfate, when crystals separate out presently. The product crystallizes from benzene into colorless prisms, M. P. 119–120° C. (decomp.). Yield, 1 part.

This compound has the structure corresponding to the general Formula I in which $R^1$ is ethyl, $R^2$ is butyl and $R^3$ is H.

EXAMPLE 33

9 parts of 10% sodium hydroxide solution and 0.5 part of allylmercaptan are added to a solution of 2 parts of vitamin $B_1$ hydrochloride in 100 parts of 60% ethanol under cooling with ice-water and then a solution of 1.6 parts of iodine and 3.6 parts of potassium iodide in 30 parts of water is dropped therein under cooling with ice-water. The reaction mixture is concentrated under reduced pressure to remove the alcohol and extracted several times with ethyl acetate. The extract is dried and evaporated to dryness under reduced pressure, when an oily substance remains which crystallizes presently. The product crystallizes from benzene into colorless prisms, M. P. 132–133° C. Yield, 1 part.

This compound has the structure corresponding to the general Formula I in which $R^1$ is methyl, $R^2$ is allyl and $R^3$ is H.

EXAMPLE 34

32 parts of 10% sodium hydroxide solution and 2.1 parts of sodiocompound of methyl-mercaptan are added to a solution of 10 parts of vitamin $B_1$ hydrochloride in 500 parts of water under cooling with ice water and then a solution of 8 parts of iodine and 15 parts of potassium iodide in 150 parts of water is dropped therein while continuing the cooling. The reaction mixture is concentrated to half its volume under reduced pressure and extracted several times with ethyl acetate.

The extract is decolorized, dried and evaporated to dryness under reduced pressure, when an oily substance remains which crystallizes presently. The product crystallizes from ethyl acetate into colorless prisms, M. P. 132° C. (decomp.). Yield, 5 parts.

This compound has the structure corresponding to the general Formula I in which $R^1$ and $R^2$ are methyl and $R^3$ is H.

EXAMPLE 35

To a solution of 1.5 parts of vitamin $B_1$ hydrochloride in 20 parts of water is added 4.85 parts of 10% sodium hydroxide solution, followed by a solution of 0.8 part of butylthiothiocyanate (prepared from butyl-mercaptan and dirhodane) in 30 parts of ether and the whole is shaken at room temperature, when crystals separate out slowly. The product crystallizes from benzene into colorless prisms, M. P. 136–137° C. (decomp.) Yield, 0.7 part.

This compound has the structure corresponding to the general Formula I in which $R^1$ is methyl, $R^2$ is butyl and $R^3$ is H.

EXAMPLE 36

To a solution of 2 parts of thiamine propyl disulfide in 20 parts of 99% ethanol is added 0.3 part of nitric acid (sp. g. 1.18), the alcohol is eliminated under vacuum, and ether is added to the syrupy residue, when the latter solidifies. The product is recrystallized from alcohol-ether to give colorless needles of thiamine propyl disulfide nitrate, M. P. 108–110° C. (decomp.).

EXAMPLE 37

When dilute nitric acid is added to thiamine benzoyl disulfide, the latter dissolves, but soon new crystals separate out. The product is washed with water and recrystallized from 99% ethanol to give colorless prisms of thiamine benzoyl disulfide nitrate, M. P. 163–164° C. (decomp.).

EXAMPLE 38

To a suspension of 1 part of thiamine benzoyl disulfide in 3 parts of 99% ethanol is added 0.5 part of 50% hydrobromic acid, and a large quantity of ether is added to the resulting solution, whereupon crystals separate out. The product is recrystallized from alcohol-ether to give colorless prisms of thiamine benzoyl disulfide hydrobromide, M. P. 186–187 ° C. (decomp.).

EXAMPLE 39

Thiamine propyl disulfide hydrobromide is prepared from thiamine propyl disulfide and hydrobromic acid in the same manner as in Example 38, and the resulting crude product is purified by recrystallization from alcohol-ether to yield colorless prisms, M. P. 142–143° C. (decomp.).

EXAMPLE 40

To a suspension of 1 part of thiamine propyl disulfide in 99% ethanol is added 0.5 part of 60% perchloric acid, and a large quantity of ether is added to the resulting solution, whereupon crystals separate out. The product is recrystallized from alcohol-ether to give colorless needles of thiamine benzoyl disulfide perchlorate, M. P. 153–155° C. (decomp.).

EXAMPLE 41

Thiamine propyl disulfide perchlorate is prepared from thiamine propyl disulfide and perchloric acid in the same manner as in Example 40, and the resulting crude product is purified by recrystallization from alcohol-ether to yield colorless prisms, M. P. 153–154° C. (decomp.).

EXAMPLE 42

To a suspension of thiamine benzoyl disulfide in alcohol is added an alcoholic solution of oxalic acid, and ether is added to the resulting solution, whereupon crystals separate out. The product is recrystallized from alcohol-ether to give colorless prisms of thiamine benzoyl disulfide oxalate, M. P. 155–156° C. (decomp.).

EXAMPLE 43

Thiamine propyl disulfide oxalate is prepared from thiamine propyl disulfide and oxalic acid in the same manner as in Example 42. The purified product (colorless needles) melts at 128–129° C. (decomp.).

EXAMPLE 44

To a suspension of thiamine benzoyl disulfide is added hydriodic acid until the former dissolves, and the solution is filtered and allowed to stand, whereupon colorless prisms, M. P. 165–166° C., of thiamine benzoyl disulfide hydriodide separate out.

EXAMPLE 45

A solution of thiamine benzoyl disulfide in dilute sulfuric acid is concentrated in vacuo, and ether is added to the syrupy residue, when the latter solidifies. The product is recrystallized from alcohol-ether to give colorless needles of thiamine benzoyl disulfide sulfate, M. P. 160–161° C. (decomp.).

EXAMPLE 46

Crystals of thiamine methyl disulfide are added to a small quantity of ethanolic hydrochloric acid. The new crystals formed are filtered and recrystallized from a mixture of alcohol and ether to give colorless needles of thiamine methyl disulfide hydrochloride, M. P. 171–172° C. (decomp.).

EXAMPLE 47

Thiamine ethyl disulfide is treated with ethanolic hydrochloric acid, to obtain thiamine ethyl disulfide hydrochloride. The product, colorless needles, shows a M. P. 174–175° C. after recrystallization from a mixture of ethanol and ether.

EXAMPLE 48

Thiamine propyl disulfide hydrochloride is prepared from thiamine propyl disulfide and ethanolic hydrochloric acid in the same manner as in Example 46. The purified product (colorless needles) melts at 160–161° C. (decomp.).

EXAMPLE 49

A small portion of O-benzoyl thiamine methyl disulfide is added to a small quantity of ethanolic hydrochloric acid. New crystals are formed. The product is the hydrochloride of O-benzoyl thiamine methyl disulfide, melting at 182–183° C.

EXAMPLE 50

0.5 part of benzenesulfonic acid is added into a suspension of 1 part of thiamine propyl disulfide in 10 parts of water. After the mixture is evaporated under reduced pressure, a yellowish oily residue is obtained. Petroleum benzine is added into a solution of this residue in a small portion of ethanol, and the resulting substance is recrystallized from a mixture of ethanol and petroleum benzine, whereupon 0.9 part of thiamine propyl disulfide benzenesulfonate, colorless grains, melting at 161° C., is obtained.

The bases, according to the present invention, also form salts with a wide variety of additional acids such for example as lactate, malonate, malate, maleate, citrate, tartrate, methanesulfonate, etc. All the herein disclosed salts are useful medicinally for the purposes herein described.

This application is in part a continuation of copending application Serial No. 326,148, filed on December 15, 1952.

Having thus disclosed the invention, what is claimed is:

1. A member selected from the class consisting of compounds which correspond to the formula $$\begin{array}{c} N=C-NH_2 \quad CHO \\ R^1-C \quad C-CH_2-N \quad S-SR^3 \\ \| \quad \| \\ N-CH \quad C=C \\ \quad CH_3 \quad CH_2-CH_2OR^3 \end{array}$$

and the medicinally useful salts thereof, wherein $R^1$ is a member selected from the group consisting of methyl and ethyl, $R^2$ is a member selected from the group consisting of lower alkyl, lower alkenyl, lower hydroxyalkyl, lower aralkyl and mononuclear carbocyclic aryl, and $R^3$ is a member selected from the group consisting of H, acetyl and benzoyl.

2. A compound which corresponds to the formula $$\begin{array}{c} N=C-NH_2.HCl \quad CHO \\ CH_3-C \quad C-CH_2-N \quad S-S-alkyl \\ \| \quad \| \\ N-CH \quad C=C \\ \quad CH_3 \quad CH_2-CH_2OH \end{array}$$

wherein the alkyl group contains at most 12 carbon atoms.

3. A compound which corresponds to the formula $$\begin{array}{c} N=C-NH_2 \quad CHO \\ CH_3-C \quad C-CH_2-N \quad S-S-alkyl \\ \| \quad \| \\ N-CH \quad C=C \\ \quad CH_3 \quad CH_2-CH_2OH \end{array}$$

wherein the alkyl group contains at most 12 carbon atoms.

4. A compound which corresponds to the formula $$\begin{array}{c} N=C-NH_2 \quad CHO \\ CH_3-C \quad C-CH_2-N \quad S-S-lower\ alkenyl \\ \| \quad \| \\ N-CH \quad C=C \\ \quad CH_3 \quad CH_2-CH_2OH \end{array}$$

5. A compound which corresponds to the formula $$\begin{array}{c} N=C-NH_2 \quad CHO \\ CH_3-C \quad C-CH_2-N \quad S-S-alkyl \\ \| \quad \| \\ N-CH \quad C=C \\ \quad CH_3 \quad CH_2-CH_2O.OC.C_6H_5 \end{array}$$

wherein the alkyl group contains at most 12 carbon atoms.

6. A compound which corresponds to the formula $$\begin{array}{c} N=C-NH_2 \quad CHO \\ CH_3-C \quad C-CH_2-N \quad S-S-lower\ aralkyl \\ \| \quad \| \\ N-CH \quad C=C \\ \quad CH_3 \quad CH_2-CH_2OH \end{array}$$

7. A method for the preparation of a compound which corresponds to the formula $$\begin{array}{c} N=C-NH_2 \quad CHO \\ R^1-C \quad C-CH_2-N \quad S-SR^2 \\ \| \quad \| \\ N-CH \quad C=C \\ \quad CH_3 \quad CH_2-CH_2OR^3 \end{array}$$

wherein $R^1$ is a member selected from the group consisting of methyl and ethyl, $R^2$ is a member selected from the group consisting of lower alkyl, lower alkenyl, lower hydroxyalkyl, lower aralkyl mononuclear carbocyclic aryl, and $R^3$ is a member selected from the group consisting of H, acetyl and benzoyl, which comprises reacting a compound of the formula $$\begin{array}{c} N=C-NH_2 \quad CH-S \\ R^1-C \quad C-CH_2-N \quad | \\ \| \quad \| \\ N-CH \quad C=C \\ \quad CH_3 \quad CH_2-CH_2OR^3 \end{array}$$

wherein $R^1$ and $R^3$ have the afore-recited significances, at a pH greater than 7, with a reactant selected from the group consisting of compounds corresponding to the formula $H-S-R^2$, $$R^2-S-S-R^2 \\ \| \\ O$$

$R^2-S-SO_3M$ and $R^2-S-S-CN$, wherein M stands for an alkali metal and $R^2$ has the afore-recited significance.

8. The compound which corresponds to the formula

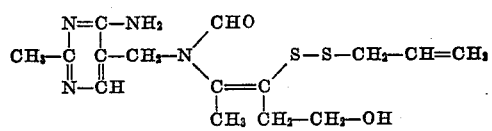

9. The compound which corresponds to the formula

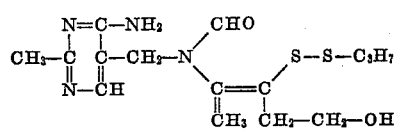

10. The compound which corresponds to the formula

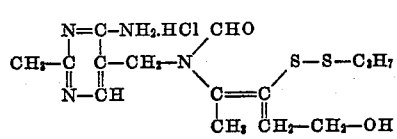

11. A process for the preparation of a compound of the formula

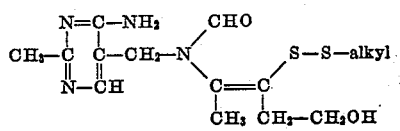

which comprises reacting the compound of the formula

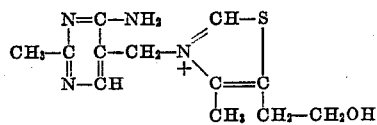

with a compound of the formula

Lower alkyl—S—S—lower alkyl
$\qquad\qquad\quad\;\;\parallel$
$\qquad\qquad\quad\;\;\;O$ 12. A process for the preparation of a compound of the formula

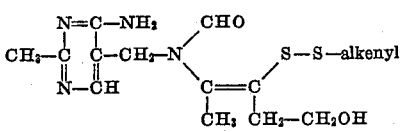

which comprises reacting the compound of the formula

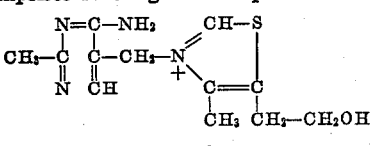

with a compound of the formula

Lower alkenyl—S—S—lower alkenyl
$\qquad\qquad\quad\;\;\parallel$
$\qquad\qquad\quad\;\;\;O$ No references cited.